(12) United States Patent
Yasuda et al.

(10) Patent No.: US 9,116,314 B2
(45) Date of Patent: Aug. 25, 2015

(54) PHOTOELECTRIC CONVERSION DEVICE

(75) Inventors: Hiroki Yasuda, Mito (JP); Kouki Hirano, Hitachinaka (JP)

(73) Assignee: HITACHI METALS, LTD., Tokyo (JP)

( * ) Notice: Subject to any disclaimer, the term of this patent is extended or adjusted under 35 U.S.C. 154(b) by 670 days.

(21) Appl. No.: 12/949,185

(22) Filed: Nov. 18, 2010

(65) Prior Publication Data

US 2011/0182546 A1    Jul. 28, 2011

(30) Foreign Application Priority Data

Jan. 26, 2010 (JP) ................................. 2010-014579

(51) Int. Cl.
  *G02B 6/36*    (2006.01)
  *G02B 6/42*    (2006.01)

(52) U.S. Cl.
  CPC .............. *G02B 6/423* (2013.01); *G02B 6/4202* (2013.01)

(58) Field of Classification Search
  None
  See application file for complete search history.

(56) References Cited

U.S. PATENT DOCUMENTS

| | | | | |
|---|---|---|---|---|
| 5,403,376 A * | 4/1995 | DeVolk et al. | ................. | 75/255 |
| 5,768,456 A * | 6/1998 | Knapp et al. | ................... | 385/49 |
| 6,910,812 B2 * | 6/2005 | Pommer et al. | ................ | 385/92 |
| 2001/0025650 A1 * | 10/2001 | Ando et al. | ................... | 136/252 |
| 2003/0123819 A1 * | 7/2003 | Nakanishi et al. | ............. | 385/92 |
| 2006/0110096 A1 * | 5/2006 | Terada et al. | .................. | 385/14 |

FOREIGN PATENT DOCUMENTS

| | | |
|---|---|---|
| JP | A-04-333806 | 11/1992 |
| JP | A-2000-347072 | 12/2000 |
| JP | B2-3729240 | 10/2005 |

* cited by examiner

*Primary Examiner* — Tina Wong
*Assistant Examiner* — Hoang Tran
(74) *Attorney, Agent, or Firm* — Scully, Scott, Murphy & Presser, P.C.

(57) ABSTRACT

A photoelectric conversion device includes an optical fiber, a molded portion covering an end portion and an end face of the optical fiber, the molded portion including a transparent resin transparent to light inputted and outputted through the optical fiber and a light input/output surface perpendicular to an optical axis of the optical fiber, electric wirings oppositely formed on the light input/output surface of the molded portion so as to sandwich a light input/output portion through which the light inputted and outputted through the optical fiber passes, and an optical device mounted on the electric wirings so as to stride over the light input/output portion. The optical device includes a surface light-emitting element or a surface light-receiving element optically coupled to the optical fiber through the molded portion.

9 Claims, 2 Drawing Sheets

FIG.1
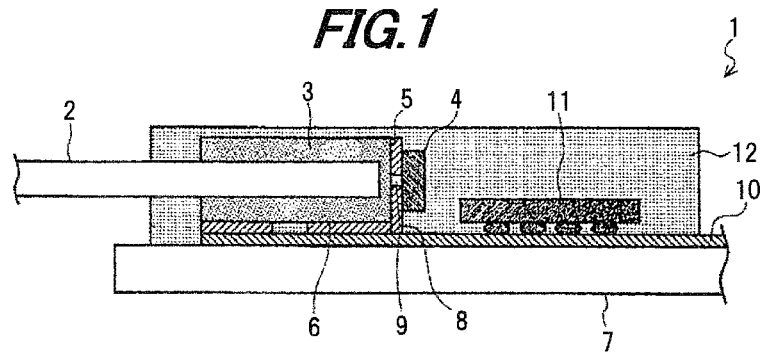
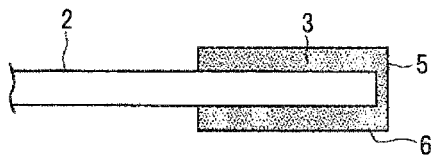
FIG.2A
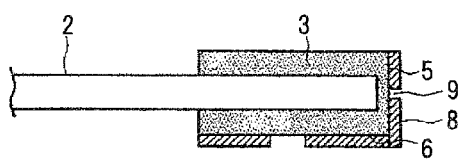
FIG.2B
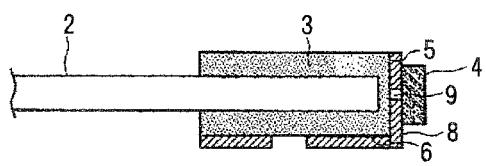
FIG.2C
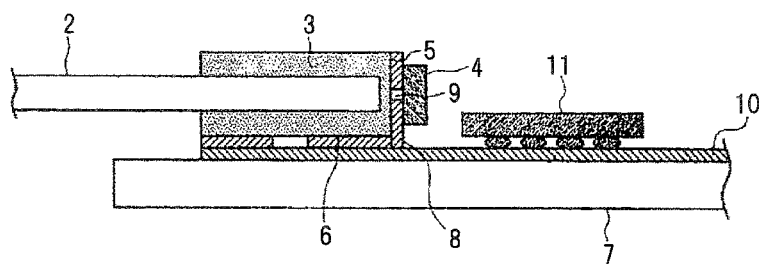
FIG.2D
1 PHOTOELECTRIC CONVERSION DEVICE
2 OPTICAL FIBER
3 MOLDED PORTION
4 OPTICAL DEVICE
5 LIGHT INPUT/OUTPUT SURFACE
8 ELECTRIC WIRING
11 IC

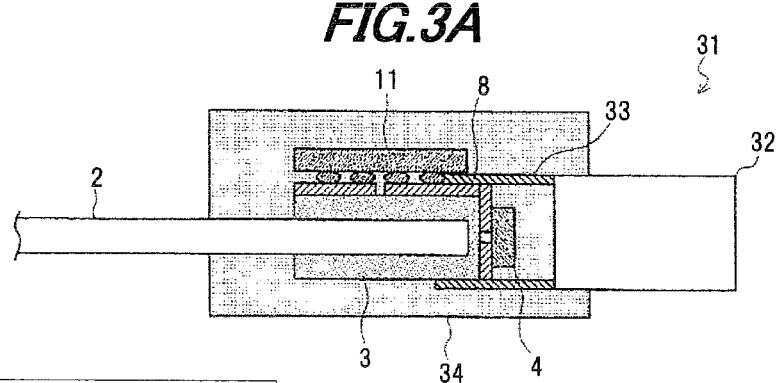
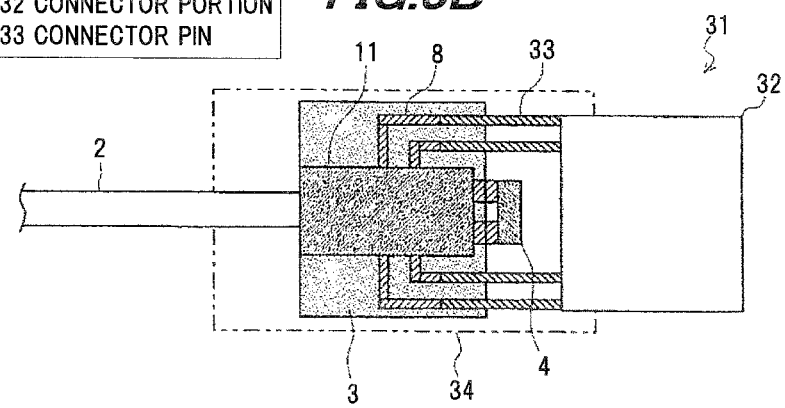
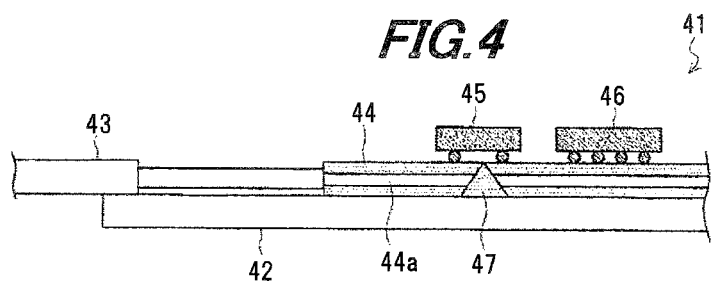

PHOTOELECTRIC CONVERSION DEVICE

The present application is based on Japanese Patent Application No. 2010-014579 filed on Jan. 26, 2010, the entire contents of which are incorporated herein by reference.

BACKGROUND OF THE INVENTION

1. Field of the Invention

The invention relates to a photoelectric conversion device for converting an optical signal into an electric signal and then outputting it, or for converting an electric signal into an optical signal and then outputting it.

2. Description of the Related Art

FIG. 4 shows the construction of a conventional photoelectric conversion device.

As shown in FIG. 4, the conventional photoelectric conversion device 41 is constructed such that an optical waveguide 44 optically coupled to an optical fiber 43 is formed on a substrate 42, and an optical device 45 composed of a surface light-emitting element or a surface light-receiving element is mounted on the optical waveguide 44 as well as an IC 46 for driving the optical device 45 or for amplifying an electric signal from the optical device 45. The optical device 45 is electrically connected to the IC 46 via a non-illustrated electric wiring which is formed on the optical waveguide 44.

In the photoelectric conversion device 41, an optical path of the optical waveguide 44 which is optically coupled to the optical fiber 43 is parallel to the substrate 42, while an optical path of the light emitted or received by the optical device 45 is perpendicular to the substrate 42. Therefore, a mirror 47 inclined 45° with respect to a core 44a is formed in the optical waveguide 44 and the optical path is changed by 90° at the mirror 47 to allow the optical coupling of the optical device 45 to the optical waveguide 44.

However, in the conventional photoelectric conversion device 41 described above, the optical fiber 43 is optically coupled to the optical device 45 via the optical waveguide 44 and it is necessary to further form the mirror 47 in the optical waveguide 44 by dicing, etc., thus, there is a problem that it takes time and labor for manufacturing and the manufacturing cost increases.

In addition, the photoelectric conversion device 41 has a problem that the optical loss occurs at two points, which are at a connecting portion between the optical fiber 43 and the optical waveguide 44 and at the mirror 47, and the optical loss occurred is thus large.

Furthermore, in the photoelectric conversion device 41, it is necessary to keep a certain distance at an optical fiber mounting portion in order to impart strength to the optical fiber whose coating is removed. In addition, since it is a structure in which the optical waveguide 44 is formed on the substrate 42 and the entire size of the device is large, further downsizing has been demanded.

To solve the above problems, JP-B-3729240 and JP-A-4-333806 have proposed photoelectric conversion devices that the optical waveguide is removed and an optical device is mounted on a tip of an optical fiber.

In detail, JP-B-3729240 proposes the photoelectric conversion device that a supporting member with an end face substantially flush with an end face of the optical fiber is formed on the periphery of an end portion of the optical fiber, a conductive layer is formed on the end face of the supporting member, and an optical device is mounted on the conductive layer to stride over the optical fiber such that a light emitting portion (or a light receiving portion) of the optical device is opposite to a core of the optical fiber to allow the optical coupling of the optical device to the optical fiber.

JP-A-4-333806 proposes the photoelectric conversion device that a ferrule is provided on an outer periphery of an optical fiber, an end face of the ferrule is matched to an end face of the optical fiber, and the optical device is mounted on the ferrule to stride over the optical fiber such that a light emitting portion (or a light receiving portion) of the optical device is opposite to a core of the optical fiber to allow the optical coupling of the optical device to the optical fiber.

SUMMARY OF THE INVENTION

However, in JP-B-3729240 and JP-A-4-333806 described above, a polishing process is required in order to expose the end face of the optical fiber, hence, a process in which the end portion of the optical fiber is cut, the coating thereon is removed to expose an optical fiber strand and the end face of the optical fiber is subsequently polished, is required. Therefore, there is a problem that it takes much time and labor, which results in the high manufacturing cost.

In addition, since it is necessary to arrange the optical device so as to stride over the end face of the optical fiber in JP-B-3729240 and JP-A-4-333806, a large optical device (at least a pad spacing thereof is larger than an outer diameter of the optical fiber strand) must be used, which is a cause of impeding the downsizing and the cost reduction (the cost is high due to the large chip size). Therefore, a low cost photoelectric conversion device allowing use of a small optical device and further downsizing is desired.

Furthermore, since the outer periphery of the edge of the optical fiber is covered by the supporting member or the ferrule in JP-B-3729240 and JP-A-4-333806, a positional offset between the optical device and the optical fiber cannot be visually judged, such as by a microscopic observation. Therefore, there is a problem that cumbersome inspection processes such as characteristics evaluation are required in order to inspect defects associated with the positional offset, which results in the high manufacturing cost.

Therefore, it is an object of the invention to provide a photoelectric conversion device that can be easily manufactured, downsized and reduced in cost.

(1) According to one embodiment of the invention, a photoelectric conversion device comprises:

an optical fiber;

a molded portion covering an end portion and an end face of the optical fiber, the molded portion comprising a transparent resin transparent to light inputted and outputted through the optical fiber and a light input/output surface perpendicular to an optical axis of the optical fiber;

electric wirings oppositely formed on the light input/output surface of the molded portion so as to sandwich a light input/output portion through which the light inputted and outputted through the optical fiber passes; and an optical device mounted on the electric wirings so as to stride over the light input/output portion, the optical device comprising a surface light-emitting element or a surface light-receiving element optically coupled to the optical fiber through the molded portion.

In the above embodiment (1) of the invention, the following modifications and changes can be made.

(i) A gap between the electric wirings formed oppositely is smaller than an outer diameter of the optical fiber and larger than a core diameter of the optical fiber.

(ii) The molded portion further comprises a substrate bonding surface parallel to an axial direction of the optical fiber, the electric wirings being extended onto the substrate bonding surface, the substrate bonding surface is placed on a circuit board that mounts an IC for driving the optical device or for amplifying an electric signal from the optical device, and the electric wirings are electrically connected to a substrate-side electric wiring formed on the circuit board to electrically connect the optical device to the IC via the electric wiring and the substrate-side electric wiring.

(iii) An IC for driving the optical device or for amplifying an electric signal from the optical device is mounted on the molded portion, and the optical device is electrically connected to the IC via the electric wirings.

(iv) A conductive ink containing metal fine particles is printed on the molded portion, and the metal fine particles are subsequently sintered by heating the printed conductive ink to form the electric wirings.

(v) The conductive ink is heated while allowing contact of the optical device with the printed conductive ink such that the electric wirings are formed simultaneously with mounting of the optical device.

(vi) The optical fiber comprises an optical fiber strand having a clad formed on a periphery of a core, and a cover layer formed on a periphery of the optical fiber strand and comprising a resin, and the molded portion covers the end portion and the end face of the optical fiber with the cover layer.

Points of the Invention

According to one embodiment of the invention, a photoelectric conversion device is constructed such that an end portion and an end face of an optical fiber are covered by a molded portion of resin to allow a transparent resin forming the molded portion to be filled in unevenness (or roughness) of the end face of the optical fiber to remedy the unevenness. Thus, the polishing process of the optical fiber is not required. Furthermore, the photoelectric conversion device is constructed such that the electric wirings are formed on the light input/output surface of the molded portion, so as to make the gap between the electric wirings at a portion for mounting an optical device smaller than the outer diameter of the optical fiber. Therefore, a small optical device with reduced pad spacing can be used that allows the downsizing of the entire photoelectric conversion device as well as the cost reduction.

BRIEF DESCRIPTION OF THE DRAWINGS

Next, the present invention will be explained in more detail in conjunction with appended drawings, wherein:

FIG. 1 is a cross sectional view showing a photoelectric conversion device in an embodiment of the present invention;

FIGS. 2A to 2D are views for explaining procedures for manufacturing the photoelectric conversion device of FIG. 1;

FIG. 3 are views showing a photoelectric conversion device in an embodiment of the invention, wherein FIG. 3A is a cross sectional view and FIG. 3B is a top view in which a protective resin mold is omitted; and FIG. 4 is a cross sectional view showing a conventional photoelectric conversion device.

DETAILED DESCRIPTION OF THE PREFERRED EMBODIMENTS

A preferred embodiment of the invention will be described below in conjunction with the appended drawings.

FIG. 1 is a cross sectional view showing a photoelectric conversion device in the present embodiment.

As shown in FIG. 1, a photoelectric conversion device 1 is provided with an optical fiber 2, a molded portion 3 formed to cover an end portion and an end face of the optical fiber 2, and an optical device 4 mounted on the molded portion 3.

Although it is not shown in the drawing, the optical fiber 2 is composed of an optical fiber strand having a clad formed on an outer periphery of a core and a resin-made cover layer formed on the outer periphery of the optical fiber strand.

A transparent resin which is transparent to light entering and exiting from the optical fiber 2 is molded so as to cover the end portion and the end face of the optical fiber 2, thereby forming the molded portion 3. The end portion of the optical fiber 2 is covered by the molded portion 3 without removing the coating thereon, in a state of having the cover layer. The end face of the optical fiber 2 is covered by the molded portion 3 without performing a polishing process.

The transparent resin used for the molded portion 3 is, e.g., epoxy- or acrylic-based UV-curing resin or thermosetting resin. In addition, it is desirable that a transparent resin having a refractive index similar to that of the core of the optical fiber 2 is used as the molded portion 3.

In the present embodiment, the molded portion 3 is formed in a substantially rectangular solid shape, and has a light input/output surface 5 perpendicular to an optical axis of the optical fiber 2 and a substrate bonding surface 6 parallel to an axial direction of the optical fiber 2. A thickness of the molded portion 3 at a tip portion, i.e., a distance from the end face of the optical fiber 2 to the light input/output surface 5 is 10-200 μm. This is because it is technically difficult to stably form the molded portion 3 when the thickness at the tip portion is thinner than 10 nm and a distance between the optical fiber 2 and the optical device 4 is too large when the thickness of the molded portion 3 at the tip portion exceeds 200 nm, which results in that the light is spread out and the loss thereof occurs.

Electric wirings 8 are formed on the light input/output surface 5 of the molded portion 3. The electric wirings 8 are formed so as to face each other and to sandwich a light input/output portion 9 through which the light entering and exiting from the optical fiber 2 passes, and the gap between the electric wirings 8 formed facing each other is smaller than an outer diameter of the optical fiber 2 (e.g., about a core diameter of the optical fiber 2). The electric wiring 8 is extended and formed on the substrate bonding surface 6.

Although the detail is described later, the electric wiring 8 is formed by printing a conductive ink (conductive paste) containing metal fine particles (e.g., silver fine particles) on the molded portion 3 and subsequently sintering the metal fine particles by heating the printed conductive ink.

The optical device 4 is formed of a surface light-emitting element or a surface light-receiving element. An optical device, in which a light emitting portion or a light receiving portion and a pad electrically connected to the electric wiring 8 are formed on the same surface (so-called flip-chip mounted optical device), is used as the optical device 4.

The optical device 4 is mounted on the electric wiring 8 so as to stride over the light input/output portion 9 and so that the light emitting portion or the light receiving portion thereof faces the core of the optical fiber 2. A method of electrically connecting the electric wiring 8 to the pad of the optical device 4 is not specifically limited, however, it should be electrically connected by using, e.g., solder (solder ball) or by ultrasonic bonding. The optical device 4 is thereby optically coupled to the optical fiber 2 via the molded portion 3.

Although it is not shown in the drawing, a resin for surely maintaining positional relationship between the optical device 4 and the optical fiber 2, which is called underfill, is filled between the optical device 4 and the light input/output surface 5 of the molded portion 3.

The electric wiring 8 formed on the substrate bonding surface 6 of the molded portion 3 is electrically connected to a substrate-side electric wiring 10 formed on a circuit board 7, and the molded portion 3 is thereby mounted on the circuit board 7. The electric wiring 8 formed on the substrate bonding surface 6 and the substrate-side electric wiring 10 formed on the circuit board 7 are electrically connected using, e.g., solder, etc.

An IC 11 for driving the optical device 4 or for amplifying an electric signal from the optical device 4 is mounted on the circuit board 7, and the optical device 4 is electrically connected to the IC 11 via the electric wiring 8 and the substrate-side electric wiring 10. Meanwhile, although it is not shown in the drawing, the circuit board 7 has a connector portion for electrically connecting to an external communication device (e.g., a card-edge connector portion which is a connecting terminal formed at an edge of the circuit board 7).

In addition, in the photoelectric conversion device 1, a protective resin mold 12 for protecting the optical device 4 and the IC 11 is provided so as to cover the molded portion 3, the optical device 4 and the IC 11.

Next, a method of manufacturing the photoelectric conversion device 1 will be described using FIG. 2.

Firstly, for manufacturing the photoelectric conversion device 1, the molded portion 3 is formed so as to cover an end portion and an end face of the optical fiber 2, as shown in FIG. 2A. In detail, an optical fiber is inserted into and held in a die, a transparent resin is poured into the die and the die is released after solidification of the transparent resin, thereby forming the molded portion 3. At this time, the optical fiber 2 is in a state that the end portion thereof still has the coating, and thus, it is not necessary to perform the polishing process on the end face of the optical fiber 2.

After the molded portion 3 is formed on the end portion and the end face of the optical fiber 2, the electric wirings 8 are formed on the light input/output surface 5 of the molded portion 3 and on the substrate bonding surface 6, as shown in FIG. 2B. In detail, the pattern of the electric wiring 8 is formed by printing a conductive ink (conductive paste) containing metal fine particles and the metal fine particles are subsequently sintered by heat treatment of the printed conductive ink, thereby forming the electric wiring 8. In the present embodiment, the conductive ink is printed on two surfaces, on the light input/output surface 5 and the substrate bonding surface 6. It may be printed on the light input/output surface 5 and the substrate bonding surface 6 sequentially or simultaneously. When the printing on the light input/output surface 5 and the substrate bonding surface 6 is simultaneously carried out, the molded portion 3 is obliquely placed so that a nozzle of the printer for spraying the conductive ink faces both the light input/output surface 5 and the substrate bonding surface 6, and the printing is carried out in this state.

After that, as shown in FIG. 2C, the optical device 4 is optically coupled to the optical fiber 2 by mounting the optical device 4 on the electric wiring 8 formed on the light input/output surface 5 of the molded portion 3 so as to stride over the light input/output portion 9, and the underfill is filled and solidified between the light input/output surface 5 and the optical device 4.

After the optical device 4 is mounted on the molded portion 3, the electric wiring 8 formed on the substrate bonding surface 6 of the molded portion 3 is electrically connected to the substrate-side electric wiring 10 by solder, etc., and the molded portion 3 is thereby mounted on the circuit board 7 as shown in FIG. 2D. As a result, the optical device 4 is electrically connected to the IC 11 via the electric wiring 8 and the substrate-side electric wiring 10.

After that, the protective resin mold 12 is provided so as to cover the molded portion 3, the optical device 4 and the IC 11. Then, the photoelectric conversion device 1 of FIG. 1 is obtained.

The operation of the present embodiment will be described.

In the photoelectric conversion device 1 of the present embodiment, the molded portion 3 is formed by molding the transparent resin so as to cover the end portion and the end face of the optical fiber 2, the electric wirings 8 are formed on the light input/output surface 5 of the molded portion 3 so as to face each other and to sandwich the light input/output portion 9 through which the light entering and exiting from the optical fiber 2 passes, and the optical device 4 is mounted on the electric wiring 8 so as to stride over the light input/output portion 9 to allow the optical coupling of the optical device 4 to the optical fiber 2 via the molded portion 3.

The conventional photoelectric conversion device is required to expose the end face of the optical fiber by removing the coating of the end portion and polishing the end face thereof, which takes much time and labor for manufacturing. However, in the photoelectric conversion device 1 of the present embodiment, the end portion and the end face of the optical fiber 2 are covered by the molded portion 3 made of resin and the transparent resin forming the molded portion 3 fills unevenness on the end face of the optical fiber 2, thus, the polishing process of the optical fiber 2 is not required. In other words, the photoelectric conversion device 1 is allowed to eliminate processes of removing the coating on the end portion of the optical fiber 2 and polishing the end face thereof, and is thus easy to manufacture, which results in that the manufacturing cost can be reduced.

Furthermore, in the photoelectric conversion device 1, since the electric wiring 8 is formed on the light input/output surface 5 of the molded portion 3, the gap between the electric wirings 8 at the portion for mounting the optical device 4 can be smaller than the outer diameter of the optical fiber 2, i.e., the electric wiring 8 can be formed on the position overlapping the optical fiber 2 (however, on the position not overlapping the core of the optical fiber 2) when the light input/output surface 5 is viewed from the front. Therefore, a small optical device 4 having a small pad spacing can be used, which allows downsizing of the entire photoelectric conversion device 1 as well as the cost reduction.

Meanwhile, in the conventional photoelectric conversion device, since the gap between the electric wirings at the portion for mounting the optical device is large, it is very difficult to mount a small optical device because the optical device comes off from the electric wiring even by small positional offset thereof. However, in the photoelectric conversion device 1, even the small optical device 4 having small pad spacing can be easily mounted since the gap between the electric wirings 8 can be small.

Furthermore, since the photoelectric conversion device 1 has the molded portion 3 made of the transparent resin, the positional relation between the optical device 4 and the optical fiber 2 can be visually judged, such as by a microscopic observation. Therefore, it is possible to eliminate the cumbersome inspection processes such as characteristics evaluations, which results in the manufacturing cost reduction.

Still further, a resin having high adhesiveness to the optical device, the electric wiring (metal) and the optical fiber strand (silica glass) needs to be used as the underfill in the conventional photoelectric conversion device. By contrast, for the photoelectric conversion device 1, it is not necessary to take adhesiveness to the silica glass into consideration since the underfill is not in contact with the silica glass which forms the optical fiber strand, thus, it is only necessary to consider adhesiveness to the optical device, metal and the molded portion. This allows an increase in choices of resins used for the underfill and allows use of cheap resin for the underfill.

Next, another embodiment of the invention will be explained.

A photoelectric conversion device 31 shown in FIGS. 3A and 3B is the photoelectric conversion device 1 further mounting the IC 11 on the molded portion 3. The optical device 4 is electrically connected to the IC 11 via the electric wiring 8.

In addition, the photoelectric conversion device 31 has a connector portion 32 which is electrically connected to external communication devices, and the connector portion 32 is electrically connected to the electric wiring 8 by a connector pin 33. A protective resin mold 34 covers the molded portion 3, the optical device 4, the IC 11 and a rear end portion of the connector portion 32 for the protection thereof. It should be noted that FIG. 3B shows a top view in which the protective resin mold 34 is omitted.

In the photoelectric conversion device 31, the length of the optical fiber mounting portion can be shortened and the circuit board 7 of the photoelectric conversion device 1 as shown in FIG. 1 can be eliminated, thus, it is possible to downsize the smaller photoelectric conversion device 31.

Next, a modification of the above-mentioned embodiment will be explained.

Although the case where the electric wiring 8 is formed and the optical device 4 is subsequently mounted on the electric wiring 8 has been described in the above-mentioned embodiment, the formation of the electric wiring 8 and the mounting of the optical device 4 may be simultaneously carried out by bringing the optical device 4 in contact with the printed conductive ink and heating the conductive ink in this state. This allows to eliminate the process of mounting the optical device 4 on the electric wiring 8 by solder, etc., manufacturing is easier and the cost can be further reduced.

In addition, although the case of using the conductive ink containing metal fine particles has been described in the above-mentioned embodiment, it is not limited thereto and a conductive ink containing carbon filler may be used.

Furthermore, although the photoelectric conversion devices 1 and 31 in which one optical fiber 2 is used have been described in the above-mentioned embodiment, the invention is applicable to a fiber array (a tape-shaped optical fiber) in which plural optical fibers are arranged in parallel. In this case, the molded portion is formed so as to collectively cover the end portion and the end face of the fiber array, and the arrayed optical device is mounted on the light input/output surface of the molded portion. As for the fiber array, if the coating on the end portion is removed, a collective cover layer for collectively covering the optical fiber is also removed, which results in a state that the positions of the exposed optical fiber strands are random. However, since the molded portion is formed without removing the collective cover layer in the present invention, the positions of the optical fiber strands are not random. Although the case of using the arrayed optical device has been described here, it is, of course, possible to mount optical devices so as to correspond to each optical fiber, instead of using the arrayed optical device.

As described above, the present invention is not intended to be limited to the above-mentioned embodiments, and the various kinds of embodiments can be, of course, implemented without departing from the gist of the invention.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A photoelectric conversion device, comprising:
    an optical fiber comprising an optical fiber strand having a cladding formed around a core and an outer peripheral resin-made cover layer formed around the entire circumferential surface of the optical fiber strand;
    a solid uniform monolithic end cap configured to conform to a shape complementary the shape of an end of the optical fiber along the entire circumference of the optical fiber along a portion of the longitudinal surface extending from an end face and the end face of the optical fiber, the solid uniform monolithic end cap comprising a transparent resin transparent to light inputted and outputted through the optical fiber and a light input/output surface perpendicular to an optical axis of the optical fiber, a distance from the end face of the optical fiber to the light input/output surface being not less than 10 μm and not more than 200 μm, the resin-made cover layer being formed around the optical fiber strand at least along an entire length of the solid uniform monolithic end cap-covered area in a longitudinal direction of the optical fiber strand;
    electric wirings oppositely formed on the light input/output surface of the solid uniform monolithic end cap so as to sandwich a light input/output portion through which the light inputted and outputted through the optical fiber passes; and
    an optical device mounted on the electric wirings so as to stride over the light input/output portion, the optical device comprising a surface light-emitting element or a surface light-receiving element optically coupled to the optical fiber through the solid uniform monolithic end cap.

2. The photoelectric conversion device according to claim 1, wherein a gap between the electric wirings formed oppositely is smaller than an outer diameter of the optical fiber and larger than a core diameter of the optical fiber.

3. The photoelectric conversion device according to claim 1, wherein the solid uniform monolithic end cap further comprises a substrate bonding surface parallel to an axial direction of the optical fiber, the electric wirings being extended onto the substrate bonding surface,
    the substrate bonding surface is placed on a circuit board that mounts an IC for driving the optical device or for amplifying an electric signal from the optical device, and
    the electric wirings are electrically connected to a substrate-side electric wiring formed on the circuit board to electrically connect the optical device to the IC via the electric wiring and the substrate-side electric wiring.

4. The photoelectric conversion device according to claim 1, wherein an IC for driving the optical device or for amplifying an electric signal from the optical device is mounted on the solid uniform monolithic end cap, and
    the optical device is electrically connected to the IC via the electric wirings.

5. The photoelectric conversion device according to claim 1, wherein a conductive ink containing metal fine particles is printed on the solid uniform monolithic end cap, and the metal fine particles are subsequently sintered by heating the printed conductive ink to form the electric wirings.

6. The photoelectric conversion device according to claim 5, wherein the conductive ink is heated while allowing contact of the optical device with the printed conductive ink such that the electric wirings are formed simultaneously with mounting of the optical device.

7. The photoelectric conversion device according to claim 1, wherein an underfill is filled between the optical device and the light input/output surface of the solid uniform monolithic end cap.

8. A method for fabricating a photoelectric conversion device, comprising:
    placing an optical fiber in a die covering an end of the optical fiber;
    pouring a transparent resin in the die to cover an end of an optical fiber along the entire circumference of the optical fiber along the longitudinal surface including the resin-made cover layer and an end face of the optical fiber being pre-formed of an optical fiber strand and an outer peripheral resin-made cover layer around the optical fiber strand;
    solidifying the transparent resin to form a solid uniform monolithic end cap configured to conform to a shape complementary to the shape of an end of the optical fiber along the entire circumference of the optical fiber along a portion of the longitudinal surface extending from an end face and the end face of the optical fiber, the solid uniform monolithic end cap comprising a light input/output surface perpendicular to an optical axis of the optical fiber, a distance from the end of the optical fiber to the light input/output surface being not less than 10 μm and not more than 200 μm, the transparent resin being transparent to light inputted and outputted through the optical fiber, the resin-made cover layer being formed around the optical fiber strand at least along an entire length of the solid uniform monolithic end cap-covered area in a longitudinal direction of the optical fiber strand;
    forming electric wirings oppositely on the light input/output surface of the solid uniform monolithic end cap so as to sandwich a light input/output portion through which the light inputted and outputted through the optical fiber passes; and
    mounting an optical device on the electric wirings so as to stride over the light input/output portion, the optical device comprising a surface light-emitting element or a surface light-receiving element optically coupled to the optical fiber through the solid uniform monolithic end cap.

9. The photoelectric conversion device according to claim 1, wherein the resin-made cover layer is being formed around the optical fiber strand at least over an entire area in a longitudinal direction of the optical fiber strand.

* * * * *